Figure 1:
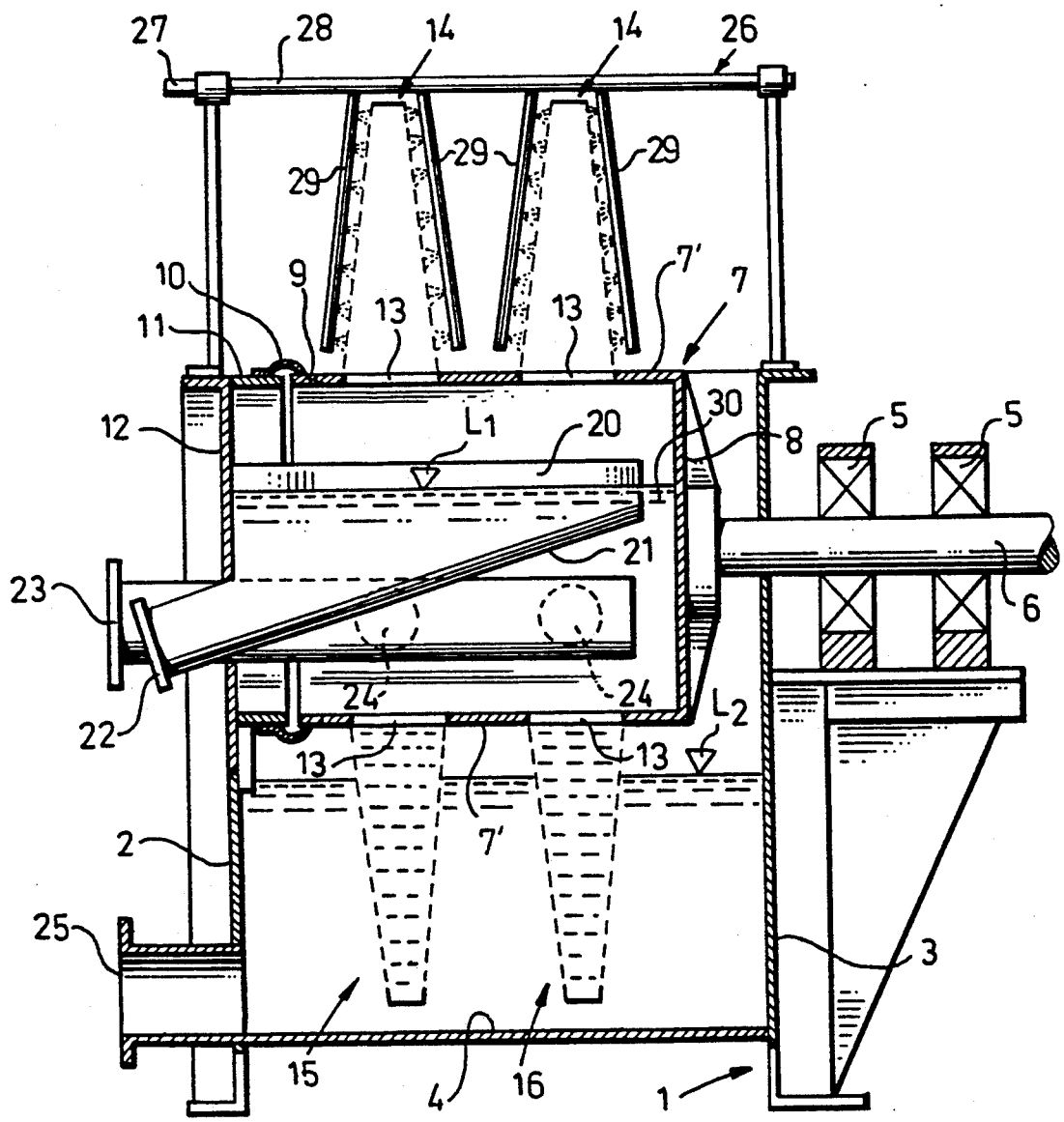

United States Patent [19]

Jakobson et al.

[11] Patent Number: 5,304,304
[45] Date of Patent: Apr. 19, 1994

[54] FILTER CLOTH ARRANGEMENT IN A ROTATING FILTER

[76] Inventors: Folke Jakobson, Hagvägen 8, S-183 30 Täby, Sweden; Harry Nilsson, Hauptstrasse 58, CH-8274 Tägerwilen, Switzerland

[21] Appl. No.: 949,868
[22] PCT Filed: May 17, 1991
[86] PCT No.: PCT/SE91/00356
§ 371 Date: Nov. 18, 1992
§ 102(e) Date: Nov. 18, 1992
[87] PCT Pub. No.: WO91/17806
PCT Pub. Date: Nov. 28, 1991

[30] Foreign Application Priority Data
May 18, 1990 [SE] Sweden .................. 9001807

[51] Int. Cl.⁵ .................................. B01D 33/23
[52] U.S. Cl. ........................... 210/331; 210/486
[58] Field of Search .................. 210/322, 323.1, 330, 210/331, 333.01, 331.1, 486, 483

[56] References Cited
U.S. PATENT DOCUMENTS
4,056,473 11/1977 Nilsson .
4,578,192 3/1986 Muller .

FOREIGN PATENT DOCUMENTS
1108828 1/1956 France .
9000557 11/1991 Sweden .

Primary Examiner—Frank Sever
Attorney, Agent, or Firm—Quarles & Brady

[57] ABSTRACT

In a rotating filter a filter cloth (18) is arranged outside a filter skeleton (34, 36). The filter cloth is provided with at least one bending resistant element (37, 38) extending through a pocket (49) arranged in or on the filter cloth (18) to restrain bulging of the filter cloth due to forces perpendicular to the plane of the filter cloth. The filter sector skeleton (34, 35, 36, 45) is provided with radially outer support and guide means (43, 44) and radially inner support and guide means (45, 46). The bending resistant element (37, 38) is at its ends adapted for detachable engagement with said means such that the ends are undisplaceable perpendicularly to the support and guide means (43, 44, 45, 46). Preferably, at least one end of the bending resistant element is displaceable in the circumferential direction of the filter sector.

10 Claims, 5 Drawing Sheets

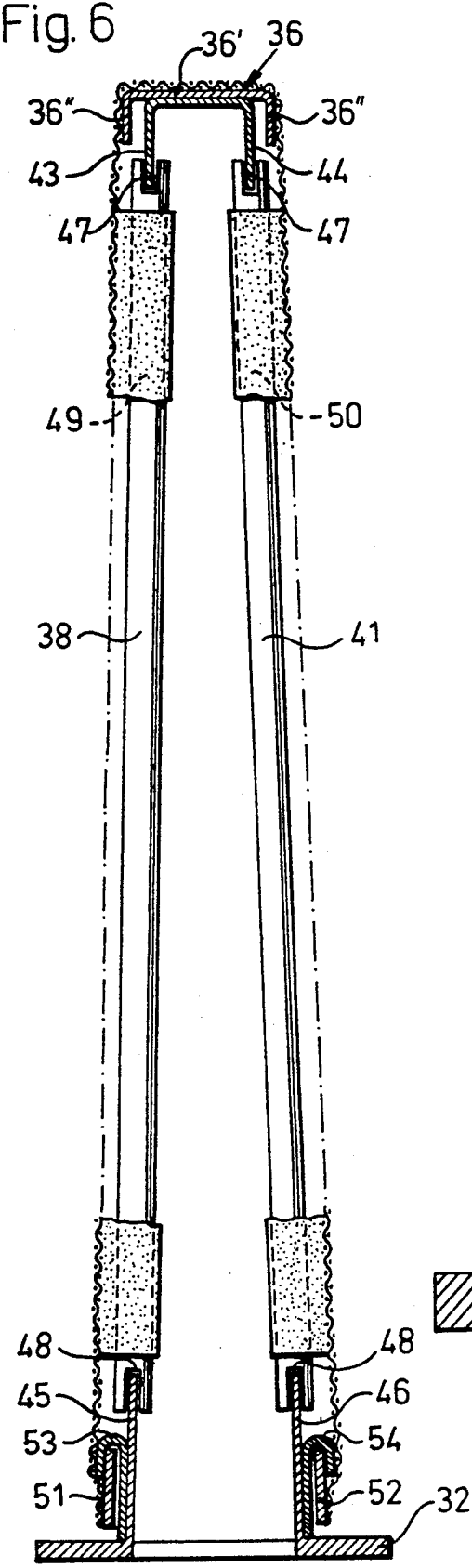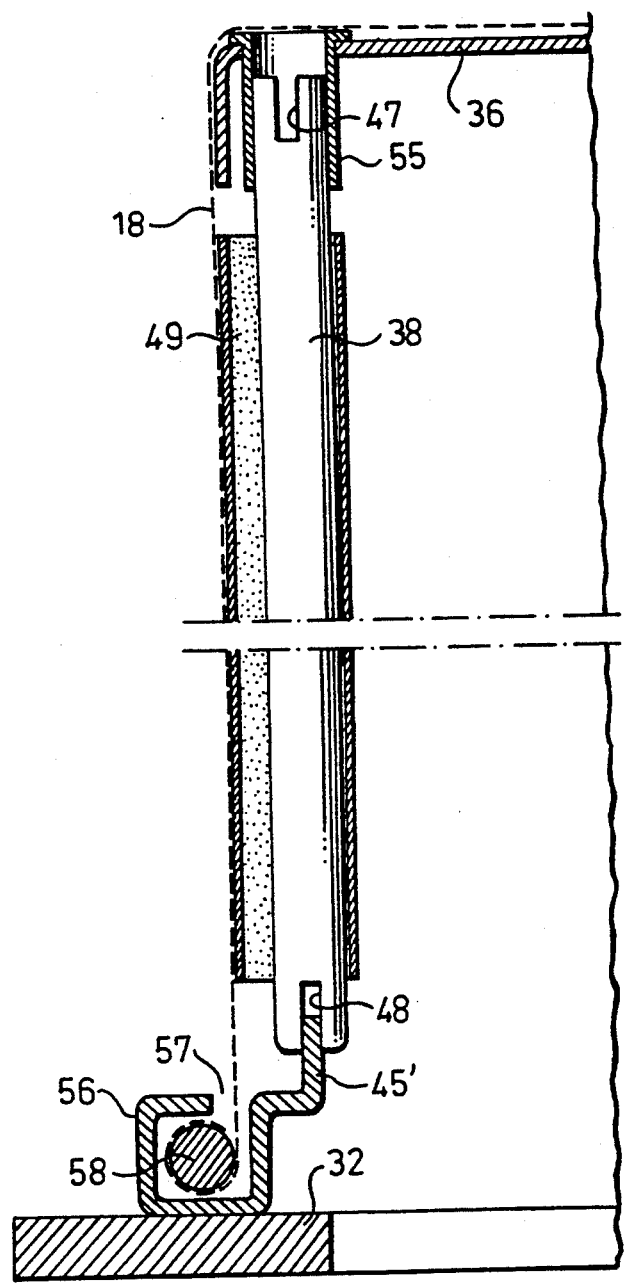

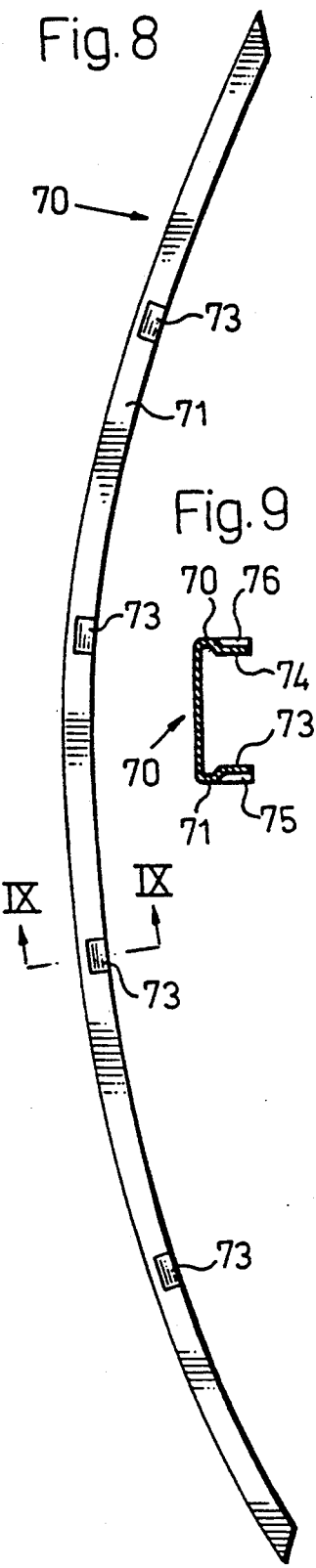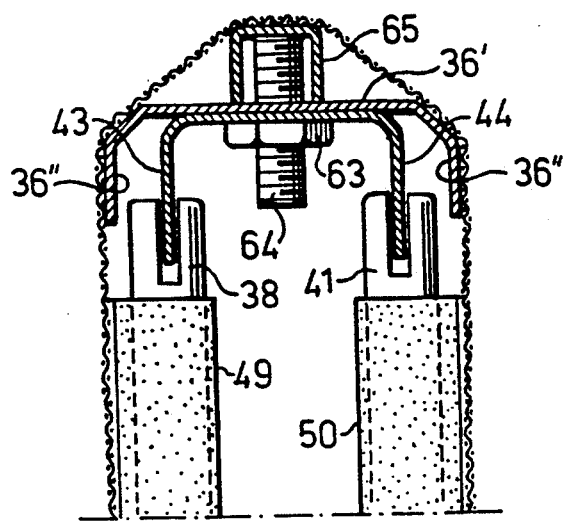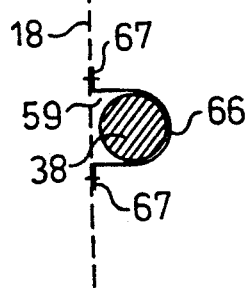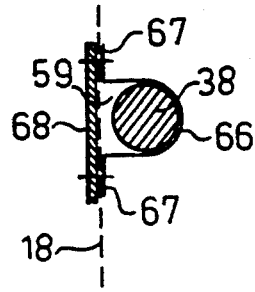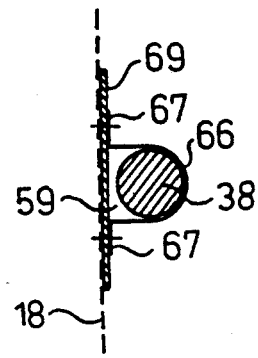

FILTER CLOTH ARRANGEMENT IN A ROTATING FILTER

The present invention concerns a filter cloth device for rotating filters, said filter cloth being arranged outside a filter sector skeleton adapted to be carried by a filter rotor, and said filter cloth being provided with at least one bending resistant element extending through a pocket arranged in or on the filter cloth to restrain bulging of the filter cloth due to forces perpendicular to the plane of the filter cloth.

For filtering or screening in process industry there exist different kinds of rotating filters to separate solid particles from liquids, such as cellulose suspensions within the paper industry, either to thicken a suspension or to clean a liquid from particles. In a common kind of such filters a plurality of filter discs are mounted on a filter rotor, each filter disc comprising a plurality of annularly arranged filter sectors. Each filter sector comprises a skeleton outside which is arranged a screen cloth. The filter rotor is arranged partly submerged in a vessel. Screening can take place either from the vessel, which then includes suspension or the like, to the inner of each filter sector, as is the case in the filter according to for instance SE-B-7406315 (corresponding to U.S. Pat. No. 4,056,473), or, if the vessel is adapted to receive filtrate, from the inner of the filter sectors to the vessel, as is the case in the filter according to SE-A-9000557-0. In the latter kind of filter, which is used particularly when screening so called fines, i.e., very small particles, it is a problem that the screen cloth is subjected to large stresses due to internal pressure when a filter sector raises above the filtrate surface in the vessel and a large amount of unfiltered liquid is still present within the filter sector. Then the filter cloth tends to bulge out from the filter sector skeleton and to be stretched. Supporting ribs on the outside of the filter cloth attached to the filter skeleton, as suggested in FR-A-1 108 828, is one possible but practically unuseful solution to this problem, since the filter cloth from time to time must be changed. Another problem in this kind of filter is that spraying with water under high pressure takes place from the outside in order to remove particles deposited on the inside of the filter cloth, which leads to inward bulging of the filter cloth, which thereby may rupture. To some extent this problem may be remedied by ribs on the inside of the filter cloth attached to the filter skeleton, but still it can not be avoided that the filter cloth slides against these ribs and is subject to wear. Thus, a filter cloth must be permanently kept so tight that it cannot bulge in any direction. However, too much convexly curved surfaces which could facilitate keeping the cloth tightened result in a filter sector taking up too much room.

U.S. Pat. No. 4,578,192 describes a device for supporting a filter cloth against bulging when compressed air is introduced into a filter sector to remove a filter cake deposited on the outside of the filter cloth. This known device, referred to in the preamble, includes a U-shaped hair pin like clip having two bending resistant elements in the shape of extended legs integrated in the filter cloth and connected by a spacing means, the length of which corresponds to the thickness of the filter sector. In one embodiment, the two legs are introduced radially from the outside into pockets in the filter cloth on both sides of the filter sector. With necessity this must be done with both legs at the same time and in parallel, which in turn necessitates that the radially outer openings of the pockets are located exactly opposite to each other and that the pockets have the same radial direction. Further, the known device ensures adequate support against outwardly directed pressure only in the end where the spacing means keep the two legs together.

The object of the present invention is to provide a solution to the problems stated such that the filter cloth is supported against pressure influence in both directions but still is simple to change and such that the bending resistant elements provide support to the filter cloth at both its ends. Further, the stiff elements shall enable the filter cloth to move in the circumferencial direction.

This has been accomplished in that the invention has been given the characteristics stated in the appended claims.

Figure 2:
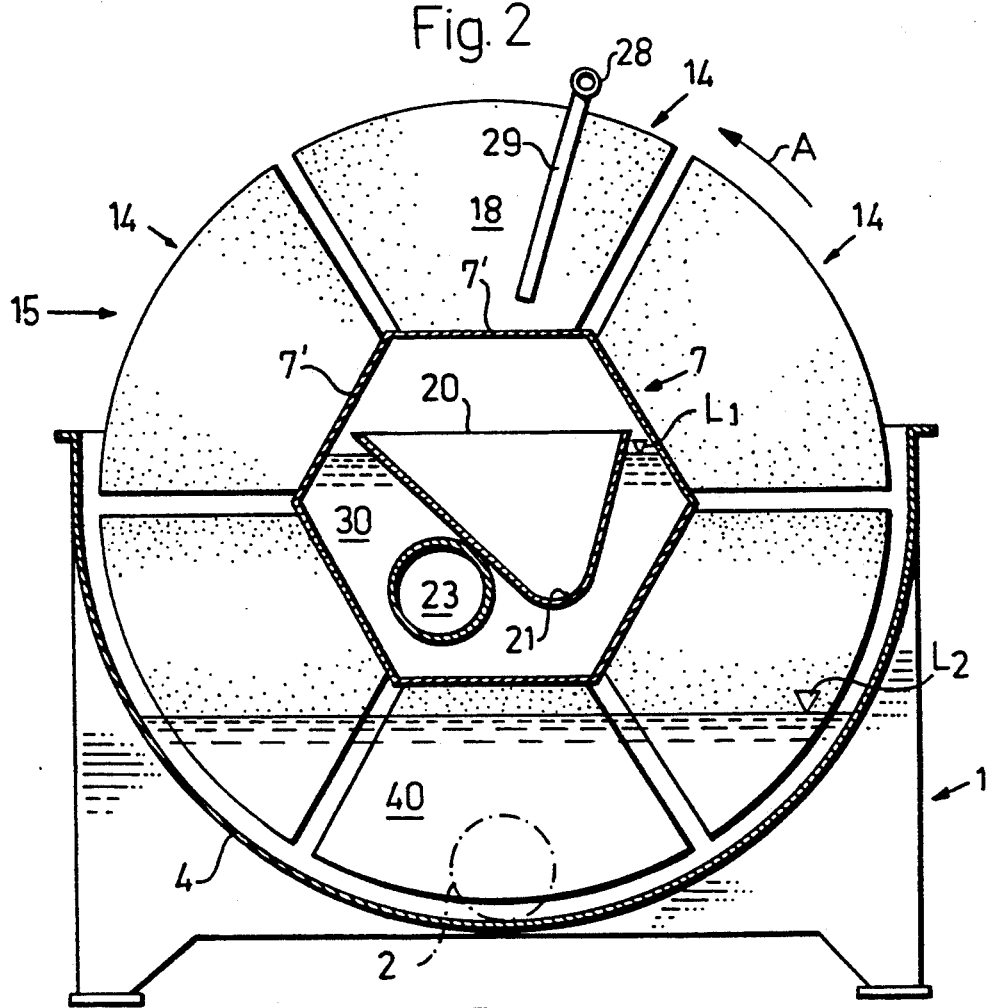
Figure 3:
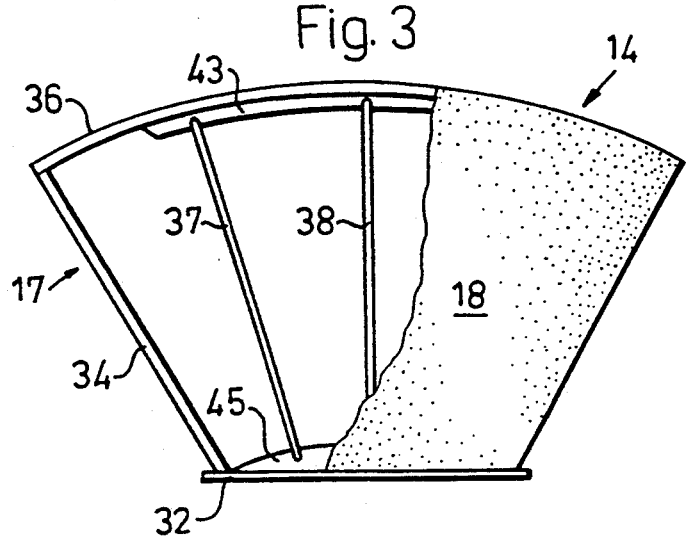
Figure 4:
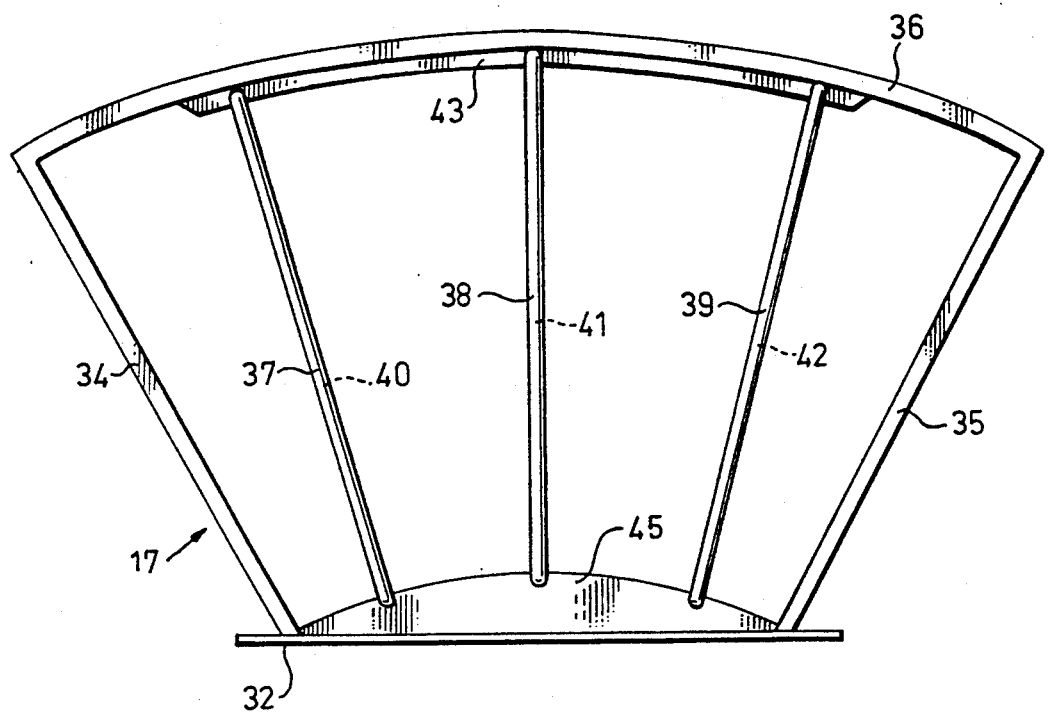
Figure 5:
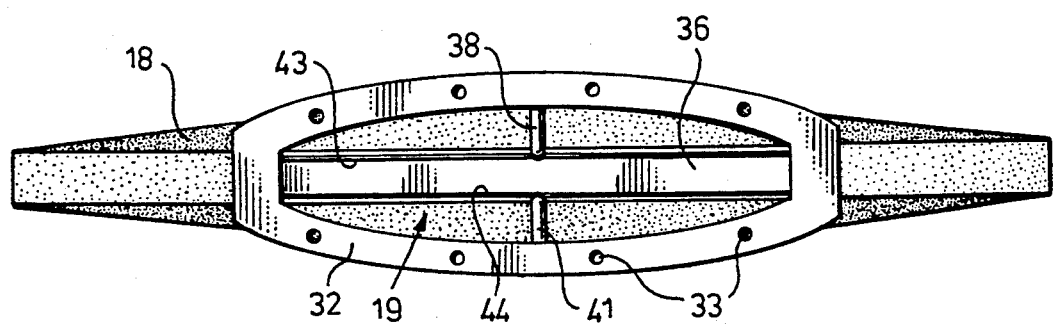

The invention will be described hereinafter reference being made to the accompanying drawings, wherein FIG. 1 is an axial section through an embodiment of a disc filter, FIG. 2 is a cross section through the filter of FIG. 1, FIG. 3 is a partly broken up side view of a filter sector according to the present invention, FIG. 4 is a side view at an enlarged scale of the filter sector of FIG. 3 having the filter cloth entirely removed, FIG. 5 is a view from underneath of the filter sector of FIG. 4 having a filter cloth mounted thereon, FIG. 6 is a radial section at an enlarged scale through the filter sector of FIG. 5, FIG. 7 is a section similar to that according to FIG. 6 but through another embodiment of the filter sector, FIG. 8 shows a radially outer support and guide rib according to another embodiment of the invention, FIG. 9 is a section taken after line IX—IX of FIG. 8, FIG. 10 shows a detail of a radial section through a filter sector, and FIGS. 11, 12 and 13 show different possibilities to provide the filter cloth with channels for the radial rods.

The disc filter shown in FIGS. 1 and 2 is of the kind which is the subject of SE-A-9000557-0 and is utilized herein merely as an example of a filter at which the device according to the present invention is applicable. In a machine stand 1 having a forward wall 2 and a backward wall 3 is arranged a filtrate vessel 4. Portions of the walls 2 and 3 also constitute the forward and backward walls of the vessel. By means of bearings 5 a shaft 6, in a non-shown manner being rotatably driveable in the direction of arrow A, is journalled on a bracket attached to the backward wall 3. On the inner end of this shaft extending through the backward wall 3 is non-rotatably mounted a hollow shaft or drum 7 having a hexagonal cross-section and having an end wall 8 carried by the shaft 6 and tightly closing the end of the drum facing the backward wall 3. The end of the drum 7 facing the wall 2 is open and is terminated by a circular ring 9 slide-sealingly contacted by a likewise annular lip seal 10 carried by an annular cylinder 11 arranged at the wall 2. More precisely, the cylinder 11 is mounted at the inside of a door 12 tightly closing the forward wall 2. The drum is tight per se, apart form its open end which, however, is sealed by means of the sealing arrangement described above.

In the flat limiting surfaces 7' of the drum 7 are openings 13 through which the interior of filter sectors 14 mounted on the outside of the drum communicates with the interior of the drum. In the example shown the drum 7 is provided with twelve filter sectors 14 arranged in the shape of two filter discs 15 and 16. Each filter sector 14 has substantially the shape of a circular sector having a truncated apex and comprising a skeleton 17 on which is arranged a filter cloth 18. Radially outwardly the filter sector is closed, whereas it radially inwardly has an opening 19 the internal shape of which corresponds to the shape of the openings 13 of the drum 7.

A collecting trough 20 extending into the drum 7 somewhat beyond the inner filter disc 16 is rigidly and liquid-tightly mounted onto the inside of the door 12. The bottom 21 of the collecting trough is somewhat inclining from the inner end towards the door 12 where it merges with an outlet 22 for solid particles. Also rigidly and liquid-tightly mounted at the door 12 is an inlet tube 23 for the liquid to be filtered. The inlet tube 23 extends into the drum at least to the inner filter disc 16. The inlet tube 23 has openings or tube pieces 24 at its periphery located opposite to the filter discs 15 and 16, respectively, to direct the incoming fluid towards the openings 13 in the drum 7 and, thereby, towards the interior of the filter sectors of the filter discs.

A filtrate outlet 25 extends from the vessel 4 through the wall 2.

On the machine stand is mounted a spray device 26 serving to direct jets of water via an inlet 27, an axially directed conduit 28 and conduits 29 connected thereto and extending along the entire radial extension of the filter discs 15 and 16 and having nozzles directed towards the filter sectors, towards the filter cloth 18 of the filter sectors for the purpose of cleaning it from particles clogging the openings of the filter cloth, but also for knocking off larger particles deposited on the inside of the filter cloth.

The function of the disc filter according to the present invention is the following. The liquid or suspension 30 to be filtered is introduced through inlet tube 23 and its openings 24 into the interior of the liquid tight drum 7. The normal operational level of the liquid 30 is indicated at $L_1$ (FIG. 2) and is always below the upper edge of the collecting trough 20. The liquid will now flow into the filter sectors located below the liquid level $L_1$ through the openings 13 in the drum 7 and the openings 19 in the filter sectors, and, under filtration through the filter cloth 18 thereof, out to the vessel 4 and therefrom to the outlet 25. By controlling the normal operational level $L_2$ of the filtrate 31 in the vessel 4 such that it is always below the level $L_1$, the filtering process takes place solely depending on the static pressure difference between the levels $L_1$ and $L_2$. Naturally, some filtration of liquid remaining in a filter sector takes place during the time it raises above the liquid level $L_2$. When the edge of a filter sector leading in the direction of rotation is in a position approximately two o'clock, i.e., where the spray conduit 29 is located in FIG. 2, the spray device 26 sprays the outside of the filter cloth 18. Particles hereby released from the filter cloth fall, or, follow the water down through the interior of the filter sector and are collected in the collecting trough 21, from where they are discharged through the outlet 22.

Due to the fact that the difference between the levels $L_1$ and $L_2$, as is shown in FIGS. 1 and 2, may be rather great, the filter cloth is exposed to a considerable internal pressure during a great part of the filtering process which tends to bulge the filter cloth outwards. On the other hand, during the above-mentioned spraying from the outside the filter cloth is exposed to substantial inwardly directed pressures. Particularly the first mentioned pressure, but also the alterations of pressure directions, result in that the filter cloth may be stretched and eventually rupture due to fatigue.

Therefore, according to the present invention, the filter cloth is provided with at least one and preferably a plurality of bulge restricting stiffeners in the shape of rails, ribs, profiles or other bending resistant (rigid) elements extending through pockets in or on the filter cloth along a substantial portion of the radial extension of the filter cloth, preferably in the radial direction of a filter sector. The stiffening elements should be as narrow as possible in order to as little as possible restrict the operative filtering area of the filter cloth. The stiffening elements are preferably arranged at the inside of the filter cloth and their ends are supported against portions of the filter sector skeleton in the shape of support and guide means, particularly against displacement perpendicularly to the plane of the filter cloth, whereas, in certain cases, freedom of displacement is preferred in the plane of the filter cloth.

Some embodiments of stiffening elements and their cooperation with the filter cloth 18 and the filter skeleton 17 will be described hereinafter, as well as some arrangements to otherwise keep the filter cloth in a tightened condition to a filter sector.

In the example shown the filter skeleton 17 includes a fastening flange 32 having an internal opening forming the opening 19 of the filter sector. The fastening flange 32 is flat and provided with mounting holes 33 for its mounting on one of the flat surfaces 7' of the filter drum. From locations close to the ends of the fastening flange two mutually diverging straight ribs 34 and 35 extend, the relative angle of which define the sector angle and which in their radially outer ends are connected by an arcuately curved rib 36 having its centre in the centre of the sector and, consequently, in the centre of the filter rotor. In other embodiments the rib 36 may be straight i.e., when the outer circumference of the filter disc describes a polygon. According to the conventional art, a filter sector skeleton often further includes a plurality of radially and/or otherwise directed ribs which are fixedly attached to the fastening flanges 32, the curved rib 36 and possible the straight ribs 34 and 35 in order to serve as internal support for a filter cloth. In the embodiment of a filter sector according to the present invention shown in FIGS. 3, 4 and 5 there are instead arranged three circumferentially displaceable radially directed ribs on each side of the filter sector of which the three ribs 37, 38 and 39 located on one side of the filter sector are seen in FIG. 4 and only one of the three ribs 40, 41 and 42 on the other side of the sector, viz., the middle rib 41 is seen in FIG. 5.

The displaceability in the circumferential direction is achieved in that the radially outer and inner ends of the ribs are supported by and guided along radially outer arcuately curved support and guide rails 43 and 44, and radially inner likewise arcuately curved support and guide rails 45 and 46, respectively, which are concentrical to the former ones. Preferably, the arcuate shapes have their common centre in the rotational centre of the filter rotor or drum 7. In this case, the ribs 36–42 have equal length, whereby mixing-up between the ribs is avoided at mounting. In such embodiments where the rib 36 is straight the radially outer and the radially inner support and guide rails are instead parallel, the ribs 36–42 having different lengths. The outer guide ribs 43 and 44, which are mutually substantially parallel, are fixedly arranged on the radially inner side of the curved rail 36, whereas the inner guide rails 45 and 46 are fixedly arranged on the fastening flange 32 on either sides of its opening and, thus, adapted in their longitudinal extension to the oval shape of the opening shown. Of course, other shapes of the opening are possible, such as rectangular. For co-operation with the guide rails the ribs are provided in their ends with slots 47 and 48 shown in FIG. 6 which are somewhat wider than the thickness of the guide rails and engage over the outer guide rails 43 and 44 and the inner guide rails 45 and 46, respectively. Hereby the ends of the ribs are displaceable along a respective guide rail, whereas they are restricted from displacement perpendicularly thereto. The outer guide rails here comprise the flanges of an U-section, the web of which is attached to the curved rib 36.

In order to keep the filter cloth 18 to the ribs 37–42 not only against external but also internal pressure, the ribs are integrated in the filter cloth which here is to be understood such that movement of the filter cloth perpendicular to its plane is substantially immediately transferred to the ribs. One form of such integration (not shown in FIGS. 3, 4 and 5) is shown in FIG. 6 where the ribs extend through pockets or tubular channels 49,50 arranged on the inside of the filter cloth. These channels may be formed in the cloth material or be separate channels which in a suitable manner are connected to the cloth. The internal dimension of the channels is here adapted to the outer dimension of the ribs such that the movement of the cloth in the plane of the cloth is transferred to the ribs if the movement takes place in the circumferential direction, the ends of the ribs then being free to slide along the guide rails 43–46, whereas the cloth with its channels may slide in the radial direction along the ribs which are unmovably kept to the guide rails.

In a known manner the filter cloth 18 has the shape of a bag which is formed after the form of the filter sector and at some edge is provided with a zip fastener to close the bag after it has been pulled over the filter sector. Such a zip fastener (not shown) may be arranged along some of the edges of the bag, for instance the arcuate edge located over the curved rib 36, which suitably has an inverted U-section with softly rounded transitions between the web 36' of the profile and its flanges 35''. To keep the open end of the filter cloth downwards, i.e., against the fastening flange 32, the free lower edges of the cloth are provided with fastening strips 51,52 which for instance are sewn to the cloth such that an upwardly turned portion of the respective fastening strip may be brought from underneath to engagement with a hook-like fastening profile 53,54 attached to a respective inner guide rail 45,46. After the fastening strips 51,52 have been introduced into the hook-like fastening profiles the zip fastener is closed and the filter cloth 18 is shrinked by hot air treatment to tighten the filter cloth.

An alternative of the arrangement shown in FIG. 6 is shown in FIG. 7. Here the outer ends of the ribs are undisplaceable by being introduced into sleeve-like holders 55 attached to the curved ribs 36, whereas the inner ends are displaceable in the circumferential direction in a similar manner as according to FIG. 6. In this instance, however, the respective inner guide rail 45' is integrated in a holding device 56 comprising a profile attached to the fastening flange 32. This profile has a partly closed cross-section having an upwardly directed opening 57 through which the filter cloth extends. The filter cloth is arranged around a body 58 having for instance circular cross-section of a somewhat greater width than the opening 57, whereby the filter cloth is prevented from passing upwards through the opening 57. At mounting of the filter cloth the body 58 is introduced together with the filter cloth 18 through an open end of the holding device 56.

When one rib end is fixedly arranged and the other displaceable the channels may have an increasing cross-section in the direction towards the displaceable rib end.

The ribs 37–42 shown have a circular cross-section. Other cross-sectional shapes are also conceivable such as T-shaped, whereby there is also a possibility to utilize the flanges of the T-profile to glue or sew the ribs to the filter cloth.

FIGS. 8 and 9 show an embodiment where the curved rib 36 and the radially outer support and guide rails 43 and 44 are integrated in a U-section 70. By plastic working the flanges 71 and 72 thereof are shaped with a number of flat portions 73, 74, respectively, depressed into the interior of the U-section and serving as guides for the radially outer end of one rib 37–42 each. By the inwardly directed portions 75, 76, respectively, of the flanges which connect the flanges to the flat portions 73, 74, respectively, and which have a length in the peripheral direction exceeding the thickness of the ribs, the displaceability of the ends of the ribs is limited. Hereby is further obtained well defined locations for the ends of the ribs which facilitates the mounting. Corresponding limiting guides may be arranged on the radially inner support and guide rails.

In a case where the filter cloth cannot be tightened by shrinkage, for instance if it is made of metal, the arrangement shown in FIG. 10 is proposed for tightening the cloth in the radial direction. A nut 63 is welded to the inside of the U-shaped section the flanges of which form the outer guide rails 43 and 44. Through a nut 63 and non-shown holes in the web of said section and the web 36' of a curved rib 36 a screw 64 may be threaded thereby pressing against the inside of the web of a U-shaped section 65 which is loosely arranged between the curved rib 36 and a filter cloth 18. Suitably, a plurality of nuts 63 and associated screws 64 are arranged along the curved rib 36. For tightening the filter cloth in the circumferential direction similar arrangements (not shown) may be located along the straight ribs 34 and 35.

Some different possibilities to provide the pockets or channels 49, 50 are shown in FIGS. 11, 12 and 13. In FIG. 11 a piece of filter cloth or other suitable material is shaped to a profile 66 which, by means of outwardly turned flanges 67, is sewn or glued to the filter cloth 18. In FIG. 12, in addition, a reinforcing layer 68 of filter cloth or, for instance, a plastic strip is sewn through. As an alternative, in FIG. 13 a layer 69 of filter cloth or other suitable material having a greater extension than the flanges 67 of the profile 66 is attached between the profile and the filter cloth 18.

We claim:

1. A filter cloth device for rotating filters, said device comprising:
    a filter sector skeleton (34, 35, 36, 45) able to be carried by a filter rotor (15);
    a filter cloth, said filter cloth (18) being arranged outside said filter sector skeleton;
    at least one bending resistant element (37–42) extending through a pocket (49, 50) connected to the filter cloth (18) to restrain bulging of the filter cloth due to forces in an axial direction perpendicular to the plane of the filter cloth, said filter sector skeleton (34, 35, 36, 45) having radially outer support and guide means (43, 44) and radially inner support and guide means (45, 46; 73, 74) parallel thereto, said bending resistant element (37-42) at its ends having means for detachably engaging said support and guide means such that the ends are substantially undisplaceable in said axial direction but are displaceable in a circumferential direction of the rotor.

2. A filter cloth device according to claim 1, characterized in that at least one end of the bending resistant element (37-42) is displaceable in the peripheral direction (A) of the filter rotor along one of the support and guide means (43-46).

3. A filter cloth device according to claim 2, characterized in that the radially outer support and guide means (43, 44, 73, 74) and the radially inner support and guide means (45, 46) have the shape of concentric circular arcs.

4. A filter cloth device according to claim 1, characterized in that the radially outer support and guide means (43, 44; 73, 74) and the radially inner support and guide means (45, 46) have the shape of concentric circular arcs.

5. A filter cloth device according to claim 1, characterized in that the filter cloth (18) at its radially inner edge is provided with engagement means (51, 52; 58) adapted to cooperate with fastening means (53, 54; 56) provided at the radially inner end of the filter sector skeleton.

6. A filter sector device according to claim 1, characterized in that the filter sector skeleton at its radially outer periphery (36) is provided with a tightening device (63, 64, 65) adapted to tighten the filter cloth (18) radially outwardly upon actuation.

7. A filter cloth device according to claim 1, characterized in that at least one of the parts (34, 35) defining the filter sector angle of the filter sector skeleton is provided with a tightening device adapted to tighten the filter cloth (18) in the circumferential direction upon actuation.

8. A filter cloth device according to claim 7, characterized in that the tightening device includes a part (65) unfixed to the filter sector skeleton and positioned between the filter cloth (18) and the filter sector skeleton and being actuatable from the interior of the filter sector.

9. A filter cloth device according to claim 1, characterized in that the tightening device includes a part (65) unfixed to the filter sector skeleton and positioned between the filter cloth (18) and the filter sector skeleton and being actuatable from the interior of the filter sector.

10. A filter cloth device for rotating filters, said device comprising:
 a filter sector skeleton (34, 35, 36, 45) able to be carried by a filter rotor (15);
 a filter cloth, said filter cloth (18) being arranged outside said filter sector skeleton;
 at least one bending resistant element (37-42) extending through a pocket (49, 50) connected to the filter cloth (18) to restrain bulging of the filter cloth due to forces perpendicular to the plane of the filter cloth, said filter sector skeleton (34, 35, 36, 45) having radially outer support and guide means (43, 44) and radially inner support and guide means (45, 46; 73, 74) parallel thereto, said bending resistant element (37-42) at its ends being detachably engageable with said support and guide means wherein the ends have slots for slidingly mounting onto said support and guide means (43-47; 73, 74).

* * * * *